US008849218B2

(12) United States Patent
Oyama (10) Patent No.: US 8,849,218 B2
(45) Date of Patent: Sep. 30, 2014

(54) RADIO BASE STATION AND METHOD OF ADJUSTING RADIO PARAMETER

(75) Inventor: Teppei Oyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 13/608,008

(22) Filed: Sep. 10, 2012

(65) Prior Publication Data

US 2013/0005390 A1 Jan. 3, 2013

Related U.S. Application Data

(63) Continuation of application No. PCT/JP2010/054366, filed on Mar. 15, 2010.

(51) Int. Cl.
| | | |
|---|---|---|
| H04B 1/00 | (2006.01) | |
| H04B 7/00 | (2006.01) | |
| H01Q 3/26 | (2006.01) | |
| H04W 28/18 | (2009.01) | |
| H01Q 1/24 | (2006.01) | |
| H04W 88/08 | (2009.01) | |
| H04W 92/20 | (2009.01) | |
| H04W 24/04 | (2009.01) | |

(52) U.S. Cl.
CPC .............. *H04W 28/18* (2013.01); *H01Q 3/267* (2013.01); *H01Q 3/2605* (2013.01); *H01Q 1/246* (2013.01); *H04W 88/08* (2013.01); *H04W 92/20* (2013.01); *H04W 24/04* (2013.01)
USPC ............ 455/69; 455/68; 455/561; 455/562.1; 455/67.11; 455/67.13; 455/67.7; 455/63.1; 455/63.4; 455/522; 455/24; 455/25

(58) Field of Classification Search
USPC ............ 455/68, 69, 561, 562.1, 67.11, 67.13, 455/67.7, 63.1, 63.4, 522, 24, 25, 446, 448, 455/449
See application file for complete search history.

(56) References Cited

U.S. PATENT DOCUMENTS

| | | | |
|---|---|---|---|
| 6,104,936 A | * | 8/2000 | Kronestedt ................ 455/562.1 |
| 6,239,744 B1 | * | 5/2001 | Singer et al. .................. 342/359 |
| 6,282,434 B1 | * | 8/2001 | Johannisson et al. ...... 455/562.1 |

(Continued)

FOREIGN PATENT DOCUMENTS

| | | |
|---|---|---|
| JP | 9-9345 | 1/1997 |
| JP | 11-251995 | 9/1999 |

(Continued)

OTHER PUBLICATIONS

International Search Report dated Jun. 1, 2010, from corresponding International Application No. PCT/JP2010/054366.

*Primary Examiner* — Tuan A Tran
(74) *Attorney, Agent, or Firm* — Katten Muchin Rosenman LLP (57) ABSTRACT

A radio base station controls an antenna by adjusting a radio parameter value of the radio base station, and notifies another radio base station of the adjustment of the radio parameter value. The radio base station receives information from the other radio base station. The information relates to an influence on a radio characteristic of a cell formed by the other radio base station. The radio characteristic is influenced by the adjustment of the radio parameter of the radio base station. The radio base station readjusts the radio parameter value of the radio base station based on the information. The information relates to the influence on the radio characteristic of the cell formed by the other radio base station.

11 Claims, 9 Drawing Sheets

(56) References Cited

U.S. PATENT DOCUMENTS

| | | |
|---|---|---|
| 6,882,845 B2 | 4/2005 | Sato et al. |
| 7,218,955 B2 * | 5/2007 | Aoyama et al. ............ 455/562.1 |
| 7,352,722 B2 * | 4/2008 | Malladi et al. ................ 370/335 |
| 8,086,244 B2 * | 12/2011 | Xiao ............................ 455/453 |
| 8,229,418 B2 * | 7/2012 | Mori et al. .................... 455/424 |
| 8,364,119 B2 * | 1/2013 | Reudink ....................... 455/405 |
| 2003/0036409 A1 | 2/2003 | Sato et al. |
| 2005/0250542 A1 | 11/2005 | Aoyama et al. |

FOREIGN PATENT DOCUMENTS

| | | |
|---|---|---|
| JP | 2003-47040 | 2/2003 |
| JP | 3703764 | 7/2005 |
| JP | 2008-113136 | 5/2008 |
| JP | 2008-288932 | 11/2008 |
| JP | 2009-290494 | 12/2009 |
| WO | 01/58193 | 8/2001 |
| WO | 2005/013632 | 2/2005 |

* cited by examiner

RADIO BASE STATION AND METHOD OF ADJUSTING RADIO PARAMETER

CROSS-REFERENCE TO RELATED APPLICATION

This application is a continuation application of International Application PCT/JP2010/054366, filed on Mar. 15, 2010, and designated the U.S., the entire contents of which are incorporated herein by reference.

FIELD

The present invention relates to a radio base station and a method of adjusting a radio parameter.

BACKGROUND

In a conventional radio communication system with a plurality of radio base stations, sizes of cells, which are communication regions provided by respective radio base stations, are preliminarily determined at its design stage. Parameters for determining a coverage of the cell include radio parameters such as a transmission power of a radio base station, a tilt angle of an antenna in the radio base station, and a direction and a shape of a beam that is output from the antenna.

For example, in the case where a coverage of a cell is changed during operation of the radio communication system, a provided service is stopped and then the radio parameters are manually adjusted, or the radio base station itself is manually exchanged. In the case where the setting of the radio parameters is adjusted, it is preferred that the adjustment be performed considering an influence on communications of another nearby radio base station. Additionally, these works are preferred to be carried out every time an installation position of another nearby radio base station or a volume of communication is changed. This consequently increases time and cost for maintenance. In view of this, a radio base station autonomously adjusts its coverage of cell with a recent technique.

Patent Document 1: Japanese Patent No. 3703764

SUMMARY

However, in the conventional technique, a problem arises in that the coverage of the cell, which is formed by the radio base station, might not be adjusted with high accuracy. Specifically, in the conventional technique, the radio base station receives a signal (a perch channel) transmitted from another radio base station to a radio terminal, thus determining a radius of the cell based on the signal. Thus, an actual receiving situation or the like is not considered at the radio terminal. As a result, the conventional technique might not be able to adjust the coverage of the cell, which is formed by the radio base station, with high accuracy.

To solve the above-described problem and achieve the object, a radio base station disclosed in this application includes an adjusting unit that adjusts a radio parameter value of the radio base station. The radio base station also includes a notifying unit that notifies another radio base station of the adjustment of the radio parameter value. The radio base station also includes a receiving unit that receives information from another radio base station. The information relates to an influence from the adjustment of the radio parameter of the radio base station on a radio characteristic of a cell formed by the other radio base station. The adjusting unit readjusts the radio parameter value of the radio base station based on the information that relates to the influence from the adjustment of the radio parameter value of the radio base station on the radio characteristic of the cell formed by the other radio base station.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Embodiments of radio base stations and methods for adjusting a radio parameter disclosed in this application will be described below by referring to the accompanying drawings. The present invention is not limited to the following embodiments. Respective embodiments may be combined as proper insofar as the contents do not conflict with one another.

First Embodiment

Figure 1:
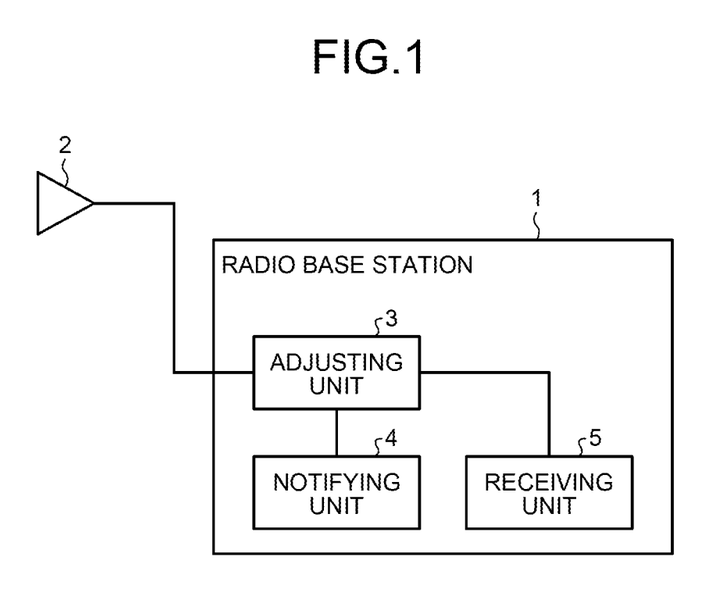
FIG. 1 is a block diagram illustrating an exemplary configuration of a radio base station according to a first embodiment.

An exemplary configuration of a radio base station according to a first embodiment will be described using FIG. 1. FIG. 1 illustrates an exemplary configuration of the radio base station according to the first embodiment. As illustrated in FIG. 1, a radio base station 1 includes an antenna 2, an adjusting unit 3, a notifying unit 4, and a receiving unit 5. The radio base station 1 forms a cell in accordance with a radio parameter value, for example, in a radio communication system that includes a plurality of other radio base stations including this radio base station 1.

The antenna 2 has a radio parameter value that is adjusted by the adjusting unit 3. The adjusting unit 3 adjusts a radio parameter value of own station. The notifying unit 4 notifies another radio base station of the adjustment of the radio parameter value by the adjusting unit 3. The receiving unit 5 receives information from the other radio base station. The information relates to an influence from the adjustment of the radio parameter of the own station, on a radio characteristic of a cell formed by the other radio base station. The adjusting unit 3 readjusts the radio parameter value of the own station based on this information, which is received at the receiving unit 5. The information relates to the influence from the adjustment of the radio parameter value of the own station, on the radio characteristic of the cell formed by the other radio base station.

As described above, the radio base station 1 readjusts the radio parameter value of the own station based on the information, which relates to the influence on the radio characteristic of the cell formed by the other radio base station. This radio characteristic is changed by the adjustment of the antenna 2 in the own station. As a result, the radio base station 1 ensures adjustment of a coverage of the cell formed by the radio base station with higher accuracy, compared with the conventional technique, which does not consider actual influence on the radio characteristic of the cell.

Second Embodiment

Configuration of a Radio Communication System

Figure 2:
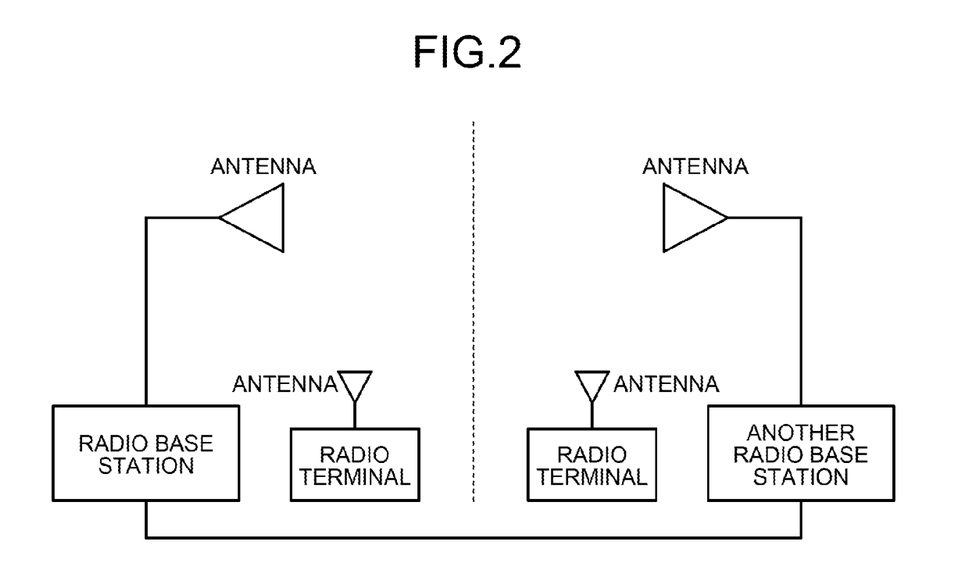
FIG. 2 is a block diagram illustrating an exemplary configuration of a radio communication system with the radio base station.

An exemplary configuration of a radio communication system with a radio base station will be described using FIG. 2. FIG. 2 is an exemplary configuration illustrating the radio communication system with the radio base station.

For example, as illustrated in FIG. 2, the radio communication system includes a radio base station and another radio base station as a plurality of radio base stations, and also includes a plurality of radio terminals that is included in cells formed by the respective radio base stations. A dotted line in FIG. 2 illustrates that a cell including the radio terminal at the radio base station side differs from a cell including the radio terminal at the other radio base station side.

In the above configuration, the respective radio terminals include an antenna for radio communication. The radio terminal performs a radio communication with another radio terminal via a radio base station that forms a cell including the radio terminals or the other radio base station. The radio terminal measures a reception quality at itself, and then notifies the radio base station that forms the cell including the own terminal or the other radio base station of the reception quality. The reception quality to be notified may include not only DL (Down Link), which is between the radio base station or the other radio base station and the radio terminal, but also UL (Up Link).

On the other hand, the radio base station adjusts a tilt angle of the antenna of its own station. The radio base station receives the reception quality from each radio terminal that is included in the cell formed by the own station. Then, the radio base station requests for a calculation value of throughput for the radio terminal in the other radio base station to the other radio base station. The request is triggered by the adjustment of the tilt angle of the antenna in its own station. The radio base station receives the calculation value of the throughput from the other radio base station. Then, the radio base station calculates a throughput in the own station using the reception quality, and determines the tilt angle of the antenna based on a throughput in the own station and a throughput in the other station to readjust it. Processing by the radio base station will be described below in detail.

Configuration of the Radio Base Station According to Second Embodiment

Figure 3:
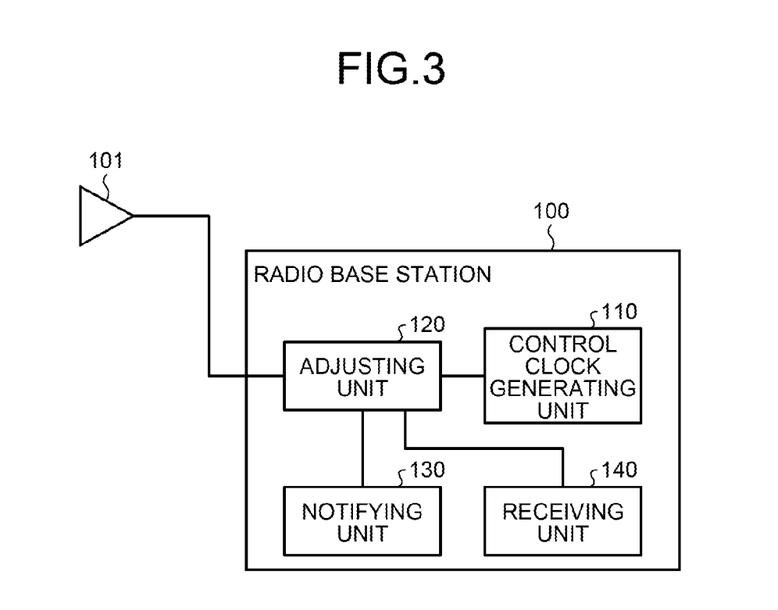
FIG. 3 is a block diagram illustrating an exemplary configuration of a radio base station according to a second embodiment.

Next, an exemplary configuration of the radio base station according to a second embodiment will be described using FIG. 3. FIG. 3 is a block diagram illustrating an exemplary configuration of the radio base station according to the second embodiment. For example, as illustrated in FIG. 3, a radio base station 100 includes an antenna 101, a control clock generating unit 110, an adjusting unit 120, a notifying unit 130, and a receiving unit 140. The radio base station 100 forms a cell corresponding to a radio parameter value. The radio base station 100 is an example of the radio base station 1 according to the first embodiment.

The antenna 101 has, for example, a radio parameter that is adjusted by the adjusting unit 120. The exemplary radio parameter includes a transmission power of the radio base station 100, a tilt angle of the antenna 101, and a direction and shape of a beam that is output from the antenna 101 or the like. Hereinafter, a tilt angle will be described as an example of the radio parameter. The antenna 101 is an example of the antenna 2 according to the first embodiment.

Figure 4A:
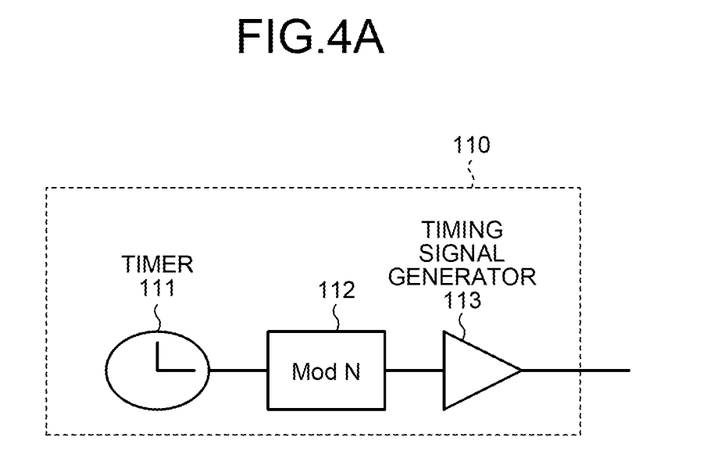
FIG. 4A is a block diagram illustrating an exemplary detailed configuration of a control clock generating unit.
Figure 4B:
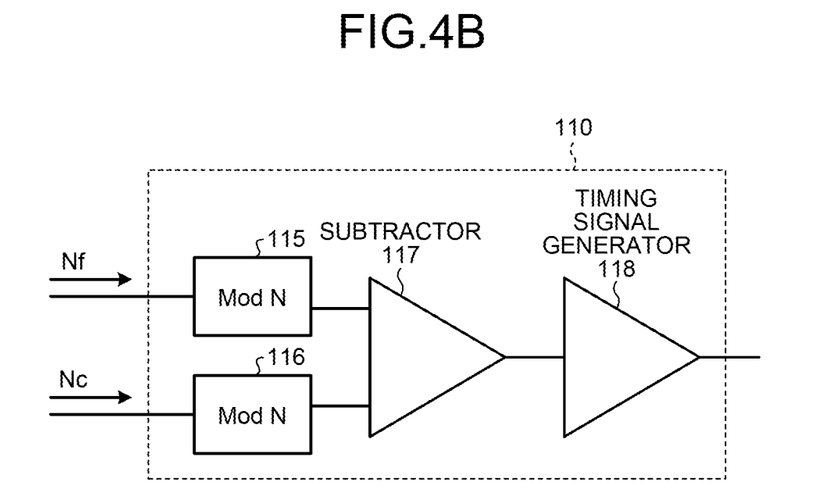
FIG. 4B is a block diagram illustrating an exemplary detailed configuration of a control clock generating unit.

The control clock generating unit 110 outputs a signal to the adjusting unit 120 in a predetermined cycle, for example. Here, an exemplary detailed configuration of the control clock generating unit 110 will be described using FIGS. 4A and 4B. FIGS. 4A and 4B are block diagrams illustrating exemplary detailed configurations of the control clock generating unit 110. The control clock generating unit 110 is assumed to employ one of the examples in FIGS. 4A and 4B, which are described below, as proper.

For example, as illustrated in FIG. 4A, the control clock generating unit 110 includes a timer 111, a Mod N 112, and a timing signal generator 113. The timer 111 starts counting time when, for example, the radio base station 100 is powered and then outputs elapsed time to the Mod N 112 by seconds. For example, the Mod N 112 executes a residue calculation of the elapsed time, which is output from the timer 111, as an integer N, thus outputting a value of the residue calculation to the timing signal generator 113. The timing signal generator 113 outputs a signal to the adjusting unit 120 in the case where, for example, the value of the residue calculation, which is output from the Mod N 112, is "0". That is, the control clock generating unit 110 outputs a signal to the adjusting unit 120 in a predetermined cycle.

For example, as illustrated in FIG. 4B, the control clock generating unit 110 includes a Mod N 115, a Mod N 116, a subtractor 117, and a timing signal generator 118. The Mod N 115 executes a residue calculation using a number "Nf" assigned to a radio frame, which is a unit of transmit data, as N, thus outputting its result to the subtractor 117. The Mod N 116 executes a residue calculation using a unique ID "Nc" as N, thus outputting a result to the subtractor 117, for example. The unique ID includes a cell ID (IDentification) that uniquely identifies the radio base station 100. The subtractor 117 calculates, for example, a difference value between the respective values of the residue calculations, which are output from the Mod N 115 and the Mod N 116, thus outputting its result to the timing signal generator 118. The timing signal generator 118 outputs, for example, a signal to the adjusting unit 120 in the case where the difference value, which is output from the subtractor 117, is "0". That is, the control clock generating unit 110 outputs a signal to the adjusting unit 120 in a predetermined cycle.

The adjusting unit 120 adjusts a tilt angle of the antenna 101, for example, when receiving the signal output from the control clock generating unit 110. The adjusting unit 120 readjusts the tilt angle of the antenna 101 based on a change in throughput of a cell formed by another radio base station, which is notified by the receiving unit 140, and a change in throughput of a cell formed by the radio base station 100. The change in throughput received from the other radio base station means a change in throughput before and after the adjustment of the tilt angle by the adjusting unit 120. The adjusting unit 120 is an example of the adjusting unit 3 according to the first embodiment.

Figure 5A:
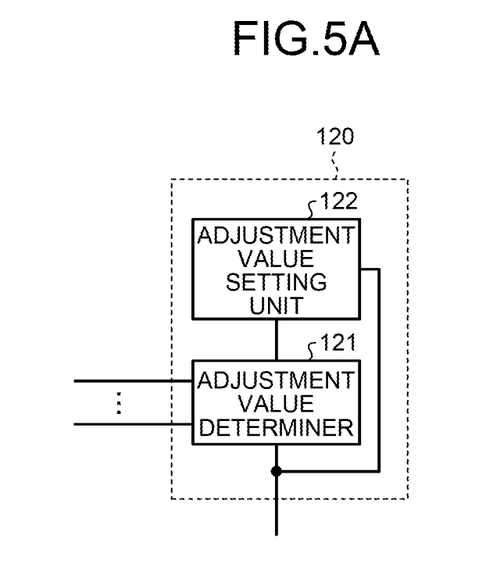
FIG. 5A is a block diagram illustrating an exemplary detailed configuration of an adjusting unit.
Figure 5B:
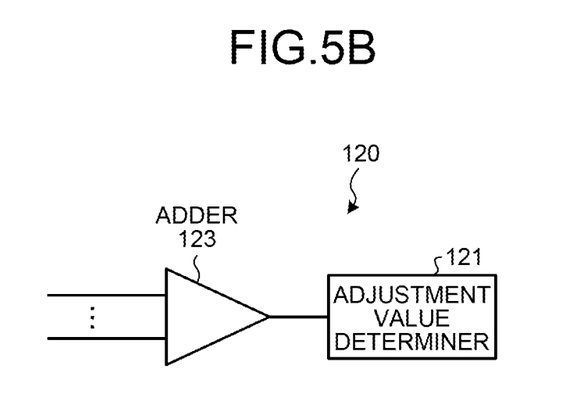
FIG. 5B is a block diagram illustrating an exemplary detailed configuration of a adjusting unit

Here, an exemplary detailed configuration of the adjusting unit 120 will be described by referring to FIGS. 5A and 5B. FIGS. 5A and 5B are block diagrams illustrating detailed configuration examples of the adjusting unit 120. The adjusting unit 120 is assumed to employ one of the configurations in FIGS. 5A and 5B, which will be described below, as proper.

For example, as illustrated in FIG. 5A, the adjusting unit 120 includes an adjustment value determiner 121 and an adjustment value setting unit 122. The adjustment value determiner 121 and the adjustment value setting unit 122 receive the signal that is output from the control clock generating unit 110. The adjustment value 121 also receives the calculation value of the throughput.

The adjustment value determiner 121 determines an adjustment value of the tilt angle to be "+Δθ" ("θ>0", this applying throughout the description that follows) based on the calculation value of the throughput, and then outputs this adjustment value to the adjustment value setting unit 122, for example, when the adjustment value determiner 121 receives the signal from the control clock generating unit 110. The adjustment value setting unit 122 changes the tilt angle of the antenna 101 by the adjustment value of "+Δθ" for the tilt angle, which is output from the adjustment value determiner 121, using a mechanical or electrical method, for example.

For example, as illustrated in FIG. 5B, the adjusting unit 120 includes an adder 123 and an adjustment value determiner 121. In FIG. 5B, the adjustment value setting unit 122, the input of the signal from the control clock generating unit 110, and the like, which are illustrated in FIG. 5A, are omitted.

The adder 123 outputs, for example, a value with the addition of the respective calculation values of the input throughputs, to the adjustment value determiner 121. In the case where the value output from the adder 123 is positive, for example, that is, in the case where it is determined that a radio characteristic is improved using "+Δθ" in the adjustment of the tilt angle, the adjustment value determiner 121 outputs it to the adjustment value setting unit 122 to employ the adjustment of the tilt angle. In the case where the value output from the adder 123 is negative, for example, that is, in the case where it is determined that a radio characteristic is not improved by the adjustment of the tilt angle, the adjustment value determiner 121 outputs "−Δθ" to the adjustment value setting unit 122 so as to turn back the adjustment of the tilt angle.

In the calculation of the throughput at the adjusting unit 120, for example, a reported value for reception quality in the radio terminal is used. Specifically, the radio terminal calculates a reception quality in the radio terminal based on the signal output from the base station, and then transmits the reception quality to the radio base station that forms the cell covering the radio terminal. The radio base station, which has received the reception quality from the radio terminal, determines an encoding method and a modulation method of data to transmit to the radio terminal based on the reception quality. In short, the throughput is calculated using the encoding method, modulation method and the like, assuming any data reception error. In the case of the UL, the radio base station demodulates and decodes the signal from the radio terminal, thus directly calculating the throughput.

The notifying unit 130 notifies, for example, the other radio base station of the adjustment of the tilt angle by the adjusting unit 120. The notification to the other radio base station by the notifying unit 130 is performed, for example, by wired communication using cables that mutually couples the radio base stations or the like, or wireless communication. The notification to the other radio base station by the notifying unit 130 is notified as a request of notifying the change in throughput of the cell formed by the other radio base station before and after the adjustment of the tilt angle by the adjusting unit 120. That is, when the other radio base station receives the request of notifying the change in throughput of the cell formed by the other radio base station, the other radio base station calculates a change in throughput and then feeds back the change to the radio base station 100. The notifying unit 130 is an example of the notifying unit 4 according to the first embodiment.

The receiving unit 140 receives the change in throughput before and after the adjustment of the tilt angle, from the other radio base station. The change is received, for example, as information of an influence on the throughput of the cell formed by the other radio base station due to the adjustment of the tilt angle by the radio base station 100. Then, the receiving unit 140 notifies the change in throughput, which is received from the other radio base station, to the adjusting unit 120. The receiving unit 140 is an example of the receiving unit 5 according to the first embodiment.

Radio Parameter Adjustment Processing According to Second Embodiment

Figure 6:
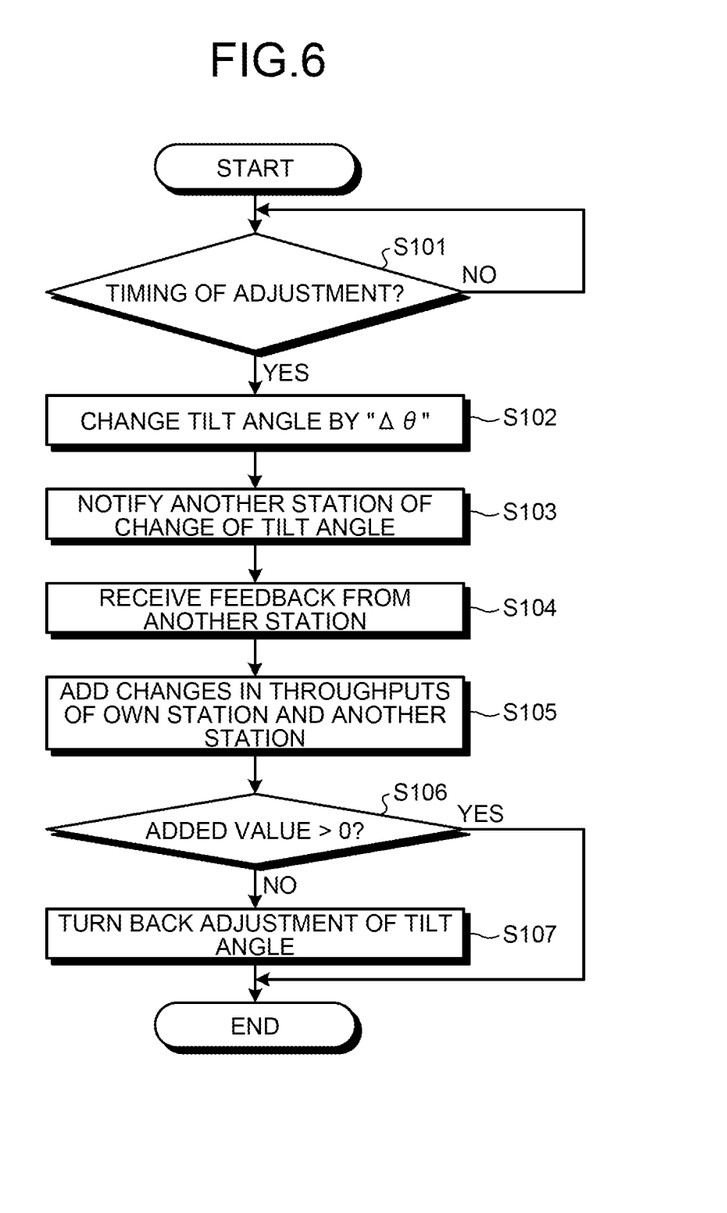
FIG. 6 is a flowchart illustrating an example of radio parameter adjustment processing according to the second embodiment.

Next, the radio parameter adjustment processing according to the second embodiment will be described using FIG. 6. FIG. 6 is a flowchart illustrating an example of the radio parameter adjustment processing according to the second embodiment. The radio parameter adjustment processing means, for example, processing for adjusting a radio parameter such as a tilt angle of the antenna 101.

For example, as illustrated in FIG. 6, in the case where a timing of adjusting the tilt angle of the antenna 101 occurs (YES in step S101), the radio base station 100 performs an adjustment to change a tilt angle of the antenna 101 by "+Δθ" (step S102). The timing of adjusting the tilt angle, for example, is triggered by a signal, which is output from the control clock generating unit 110 in a predetermined cycle. In the case where it is not the timing of adjusting the tilt angle of the antenna 101 (NO in step S101), the radio base station 100 waits for the timing of the adjustment.

Then, the radio base station 100 notifies the other radio base station of the adjustment of the tilt angle, and also requests for a change in throughput of the cell formed by the other radio base station (step S103). The change in throughput means a change in throughput of the cell formed by the other station before and after the adjustment of the tilt angle in its own station by "+Δθ". Subsequently, the radio base station 100 receives the change in throughput from the other radio base station (step S104).

Then the radio base station 100 adds the change in throughput, which is calculated from the reception quality received from the radio terminal covered by the cell of the own station, and the change in throughput received from the other radio base station (step S105). The radio base station 100 determines whether or not the addition result is positive (step S106). In the case where the addition result is positive (YES in step S106), the radio base station 100 employs the adjusted tilt angle and terminates the processing. On the other hand, in the case where the addition result is smaller than 0 (NO in step S106), the radio base station 100 turns back the adjustment of the tilt angle changed by "+Δθ" (step S107).

Control Clock Generation Processing According to Second Embodiment

Figure 7:
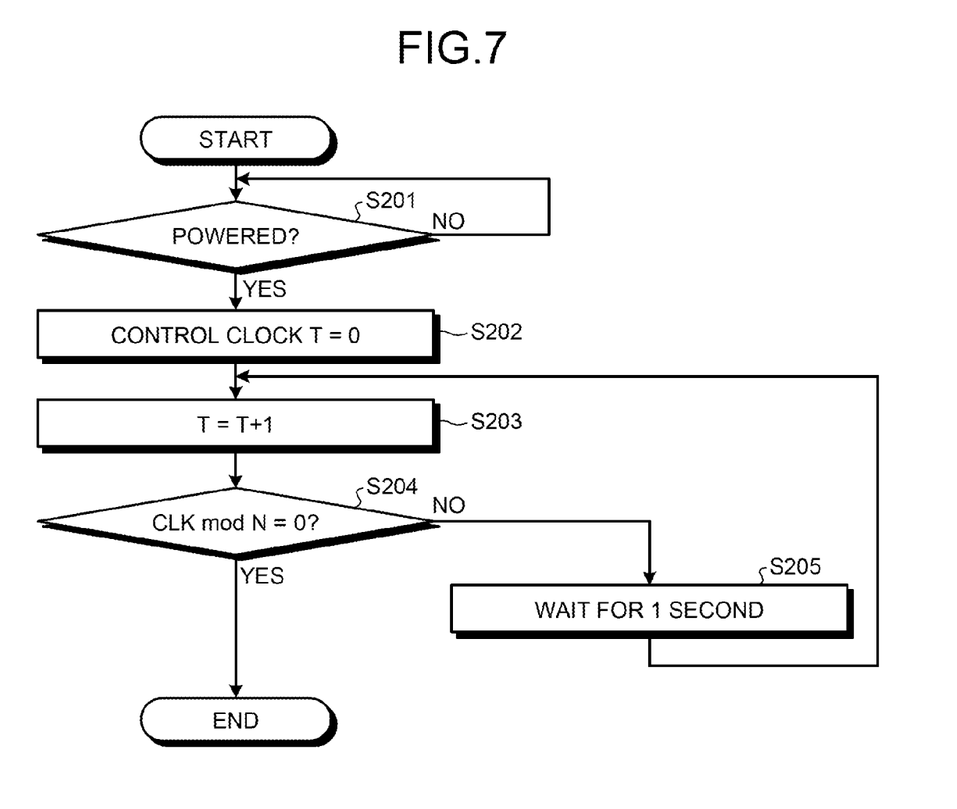
FIG. 7 is a flowchart illustrating an example of control clock generation processing according to the second embodiment.

Next, the control clock generation processing according to the second embodiment will be described using FIG. 7. FIG. 7 is a flowchart illustrating an example of the control clock generation processing according to the second embodiment. The control clock generation processing means a detail of step S101 in the radio parameter adjustment processing illustrated in FIG. 6.

For example, as illustrated in FIG. 7, in the case where the radio base station 100 is powered (YES in step S201), the radio base station 100 initializes the elapsed time T of the timer 111 as "T=0" (step S202). The radio base station 100 does not perform the processing until the radio base station 100 is powered (NO in step S201).

The radio base station 100, which has initialized the elapsed time, increments the elapsed time T, which is expressed by "T=T+1", by seconds (step S203). The radio base station 100 executes a residue calculation of the elapsed time T as the integer N so as to determine whether or not the value of the residue calculation is "0" (step S204). Then, in the case where the value of the residue calculation is "0" (YES in step S204), the radio base station 100 outputs the signal so as to perform the processing in step S102. On the other hand, in the case where the value of the residue calculation is not "0" (NO in step S204), the radio base station 100 waits for one second (step S205), and then performs the processing in step S203 again.

Advantageous Effects of Second Embodiment

As described above, the radio base station 100 readjusts the tilt angle of the own station based on: the change in throughput of the cell formed by the own station; and the change in throughput of the cell formed by the other station. This consequently ensures adjustment for a coverage of the cell, which is formed by the radio base station, with high accuracy.

Third Embodiment

While in the second embodiment above, adjustment of the tilt angle by "+Δθ" is described, the tilt angle may be adjusted to any angle. Therefore, in a third embodiment, adjusting the tilt angle to any angle will be described.

Radio Parameter Adjustment Processing According to Third Embodiment

Figure 8:
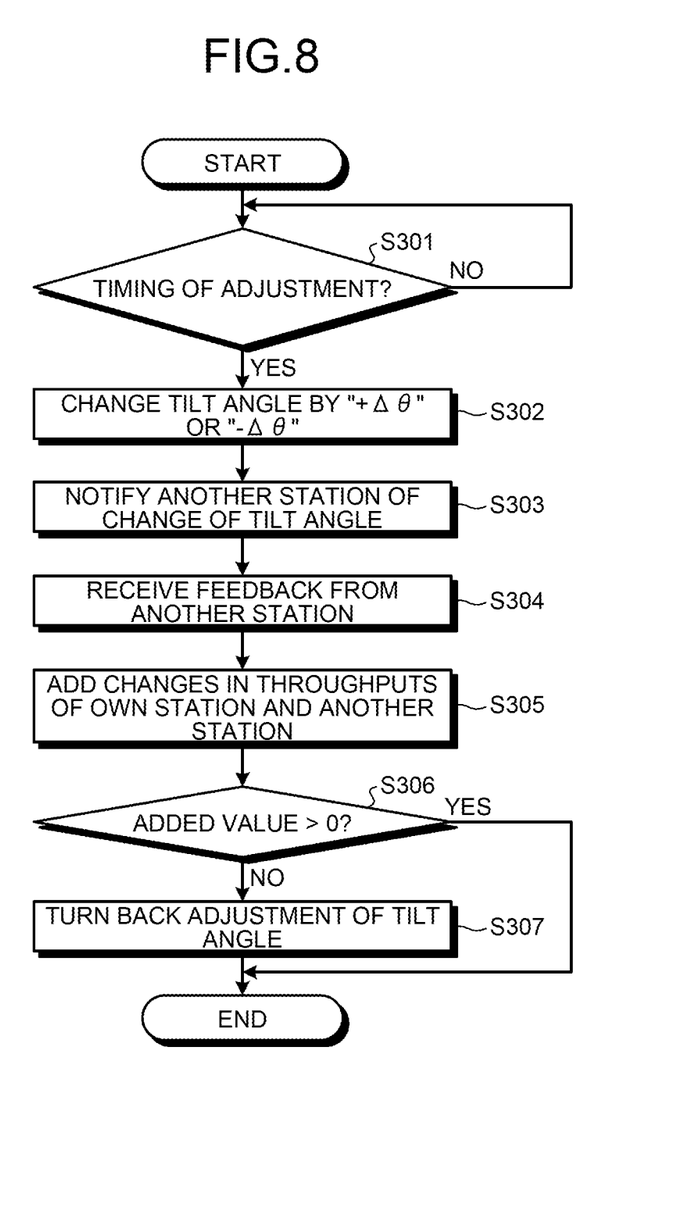
FIG. 8 is a flowchart illustrating an example of radio parameter adjustment processing according to a third embodiment.

The radio parameter adjustment processing according to the third embodiment will be described using FIG. 8. FIG. 8 is a flowchart illustrating an example of the radio parameter adjustment processing according to the third embodiment. In FIG. 8, an example of the radio parameter employs adjustment of the tilt angle.

For example, as illustrated in FIG. 8, in the case where a timing of adjusting the tilt angle of the antenna 101 occurs (YES in step S301), the radio base station 100 performs an adjustment to arbitrarily change the tilt angle by "+Δθ" or "−Δθ" (step S302). The timing of adjusting the tilt angle is triggered by, for example, a signal, which is output from the control clock generating unit 110 in a predetermined cycle. Determination of the adjustment value, which is "+Δθ" or "−Δθ", for the tilt angle is performed, for example, using a random number generator. The random number generator has a function to output "+Δθ" or "−Δθ" with a predetermined probability. The same probability of "0.5" is set to both directions. In the case where it is not the timing of adjusting the tilt angle of the antenna 101 (NO in step S301), the radio base station 100 waits for the timing of the adjustment.

Then, the radio base station 100 notifies the other radio base station of the adjustment of the tilt angle, and also requests for notifying a change in throughput of the cell formed by the other radio base station (step S303). The change in throughput means a change in throughput of the other station before and after adjusting the tilt angle of the own station by "+Δθ" or "−Δθ". Subsequently, the radio base station 100 receives the change in throughput from the other radio base station (step S304).

Then the radio base station 100 adds the change in throughput, which is calculated from the reception quality received from the radio terminal covered by the cell of the own station, and the change in throughput received from the other radio base station (step S305). The radio base station 100 determines whether or not the addition result is positive (step S306). Then, in the case where the addition result is positive (YES in step S306), the radio base station 100 employs the adjusted tilt angle and then terminates the processing. On the other hand, in the case where the addition result is smaller than 0 (NO in step S306), the radio base station 100 turns back the adjustment of the tilt angle changed by "+Δθ" or "−Δθ" (step S307).

Advantageous Effects of Third Embodiment

As described above, the radio base station 100 randomly determines an adjustment amount to adjust the tilt angle for a deeper or shallower angle. This consequently ensures an adjustment of a coverage of the cell formed by the radio base station with higher accuracy.

Fourth Embodiment

In the above-described second embodiment, adjusting the tilt angle by "+Δθ" is described. In the above-described third embodiment, randomly adjusting the tilt angle by "+Δθ" or "−Δθ" is described. However, the adjustment of the tilt angle may be performed based on a previous adjustment result of the tilt angle. Therefore, in a fourth embodiment, the adjustment of the tilt angle based on the past adjustment result of the tilt angle will be described.

Radio Parameter Adjustment Processing According to Fourth Embodiment

Figure 9:
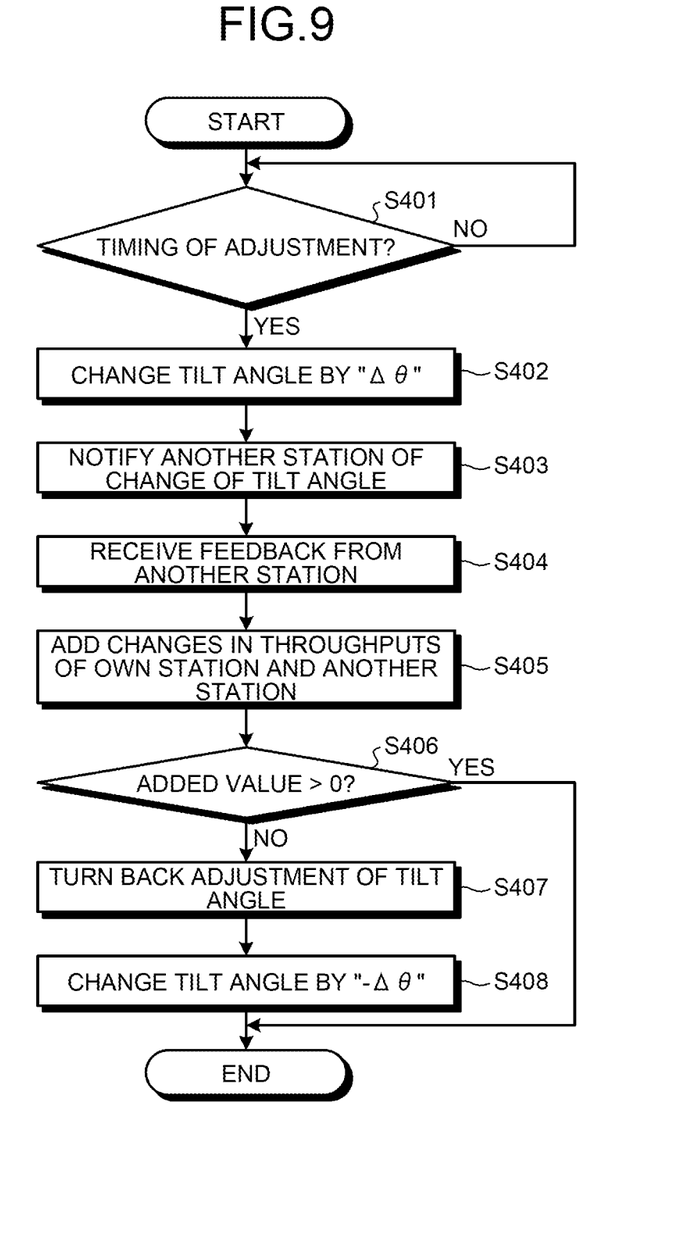
FIG. 9 is a flowchart illustrating an example of radio parameter adjustment processing according to a fourth embodiment.

The radio parameter adjustment processing according to the fourth embodiment will be described using FIG. 9. FIG. 9 is a flowchart illustrating an example of the radio parameter adjustment processing according to the fourth Embodiment. In FIG. 9, an example of the radio parameter employs the adjustment of the tilt angle. While in FIG. 9, the description includes the first adjustment of the tilt angle by "+Δθ", the adjustment of the tilt angle may use "−Δθ".

For example, as illustrated in FIG. 9, in the case where a timing of adjusting the tilt angle of the antenna 101 occurs (YES in step S401), the radio base station 100 performs an adjustment to change the tilt angle by "+Δθ" (step S402). The timing of adjusting the tilt angle is triggered by, for example, the signal, which is output from the control clock generating unit 110 in a predetermined cycle. In the case where it is not the timing of adjusting the tilt angle of the antenna 101 (NO in step S401), the radio base station 100 waits for the timing of the adjustment.

Then, the radio base station 100 notifies the other radio base station of the adjustment of the tilt angle and also requests for notifying a change in throughput of the cell formed by the other radio base station (step S403). The change in throughput means a change in throughput of the other station before and after adjusting the tilt angle of the own station by "+Δθ". Subsequently, the radio base station 100 receives the change in throughput from the other radio base station (step S404).

Then, the radio base station 100 adds the change in throughput, which is calculated from the reception quality received from the radio terminal covered by the cell of the own station, and the change in throughput received from the other radio base station (step S405). The radio base station 100 determines whether or not the addition result is positive (step S406). Then, in the case where the addition result is positive (YES in step S406), the radio base station 100 employs the adjusted tilt angle and terminates the processing.

On the other hand, in the case where the addition result is smaller than 0 (NO in step S406), the radio base station 100 turns back the adjustment of the tilt angle changed by "+Δθ" (step S407). Then, the radio base station 100 further performs an adjustment to change the tilt angle, which has been turned back, by "−Δθ" (step S408).

In short, when determining the adjustment amount of the tilt angle, the radio base station 100 determines it based on the previous adjustment result of the tilt angle. Specifically, in the case where the previous adjustment of the tilt angle is employed, the radio base station 100 adjusts the tilt angle in the same direction as the previous direction. In the case where the previous adjustment of the tilt angle is not employed, the radio base station 100 adjusts the tilt angle in the different direction from the previous direction.

Advantageous Effects of Fourth Embodiment

As described above, the radio base station 100 determines the adjustment direction of the tilt angle based on the previous adjustment result of the tilt angle. This consequently reduces the processing volume in the radio base station 100, and ensures the adjustment of the coverage of the cell with high accuracy.

Fifth Embodiment

While in the above description, embodiments of the radio base stations have been disclosed in this application, various embodiments other than the above embodiments may be employed. Therefore, the following description includes embodiments that are different in (1) a target for feedback, (2) a simple addition of reception quality, (3) a timing of failure in the radio base station, (4) a control corresponding to throughput, (5) a plurality of radio base stations, (6) a radio parameter, and (7) a configuration of the apparatus.

(1) Target for Feedback

In the above embodiments, in the case where the other radio base station calculates a change in throughput, this change is not caused by the adjusted tilt angle of the radio base station 100 and caused by a radio base station that has performed an adjustment of a tilt angle at approximately the same timing. Accordingly, when calculating the throughput, the other radio base station uses throughputs of radio terminals only, which are located at the boundary between a cell of the other radio base station and a cell of the radio base station 100 that is targeted for feedback. This consequently allows the radio base station 100 to obtain a more effective value of change in throughput, which is fed back by the other radio base station, thus ensuring adjustment of a coverage of the cell with higher accuracy.

(2) Simple Addition of Reception Quality

In the above embodiments, in the case where the throughput is used as an evaluation value, the throughput reflects an average reception quality within a cell. Covering a radio terminal with propagation environment that is poorer than other terminals may make the tilt angle deep so as not to degrade the average reception quality. Accordingly, the radio base station 100 uses a value, to which the reception quality responded by the radio terminal within the cell is simply added, as an evaluation value. That is, the radio base station 100 does not use the change in throughput of the own station and the change in throughput of the other station, but uses the change in value to which the reception quality is simply added. Thus, in the radio base station 100, even in the case where there is a radio terminal with a poor propagation environment, the evaluation value is raised, thus ensuring adjustment for a coverage of the cell with higher accuracy.

(3) Timing of Failure in the Radio Base Station

In the case where a failure has occurred in the radio base station, it is preferred that another radio base station adjacent to the failed radio base station cover the communication of radio terminals within the cell of the failed radio base station. Specifically, the failed radio base station transmits an alarm signal to notify the adjacent radio base station. The adjacent radio base station, which detects the failure, makes a cycle of adjusting a radio parameter short. That is, decreasing a dividend "N" in "Mod N" of the above embodiments allows the radio base station to promptly adjust the tilt angle so as to cover the cell formed by the failed radio base station.

(4) Control Corresponding to Throughput

The dividend "N" in "Mod N" regarding a cycle to adjust the radio parameter and the adjustment amount of "Δθ" for the tilt angle may be changed corresponding to the change in throughput. For example, in the case where a sum of throughputs in the own station and the other station is assumed to be "ΔTput", the integer "N" is assumed to be expressed by "N=Int(α−βΔT)" while the adjustment amount of the tilt angle is assumed to be "γΔT". Here, β and γ indicate arbitrary constant numbers, while Int( ) indicates rounding to an integer. As a result, in the case where a change in throughput becomes large, the radio base station 100 is able to frequently perform control to make a cycle N smaller for rapid convergence of the throughput, and also increases an adjustment amount for each adjustment. This consequently ensures a rapid convergence of the throughput.

(5) A Plurality of Radio Base Stations

Figure 10:
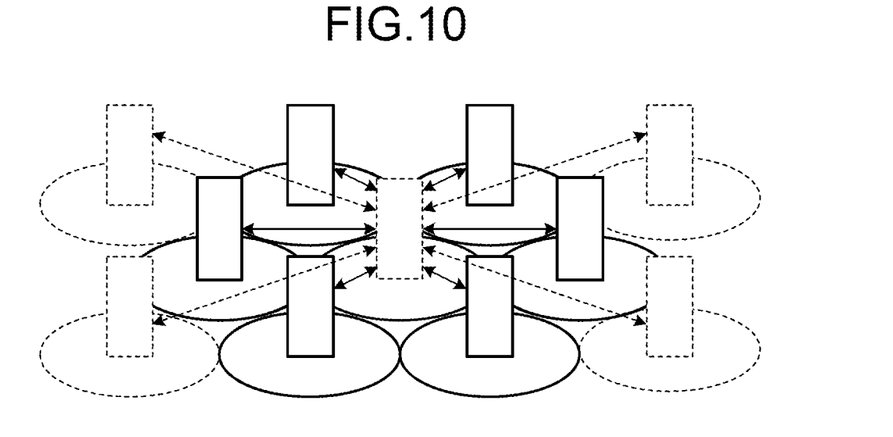
FIG. 10 is a diagram illustrating a radio communication system with a plurality of radio base stations that each include an adjustment function of a radio parameter.

This application is achieved as a radio communication system with a plurality of radio base stations that have an adjustment function for a radio parameter according to the above embodiments. FIG. 10 is a diagram illustrating an example of the radio communication system with a plurality of radio base stations that have the adjustment function for a radio parameter. In FIG. 10, a rectangle illustrates the radio base station, an ellipse illustrates a cell formed by each radio base station, and a solid line illustrates various notifications, communication regarding a throughput, and the like. A dotted line illustrates that communication regarding a throughput is not performed.

For example, when the radio base station is powered, the radio communication system in FIG. 10 executes adjustment processing for a tilt angle in a predetermined cycle. At this time, each radio base station transmits a notification of the tilt angle and a notification of change in throughput to a radio base station that forms an adjacent cell, but does not transmit a notification to a radio base station that forms a non-adjacent cell. A radio base station, which is illustrated with a rectangle in dotted lines, does not transmit a notification of throughput to the radio base station at the center of FIG. 10, and transmits a notification of throughput to an adjacent radio base station.

Here, assume that a cell ID for each radio base station is "i", a throughput is "Ti", and the radio communication system includes radio base stations with the cell IDs of 1 to N. The radio communication system has a total throughput "T" that is expressed by Formula (1). The cell ID "i" has the same meaning of a radio base station with the cell ID "i", and is also used to express it as a radio base station "i".

$$T = \sum_{i=1}^{N} T_i \tag{1}$$

At this time, assume that a tilt angle of a radio base station "j" is adjusted, and change in throughput of each radio base station "i" is "ΔTi". Then, the total change in throughput "ΔT" in the radio communication system is expressed by Formula (2)

$$\Delta T = \sum_{i=1}^{N} \Delta T_i = \Delta T_j + \sum_{i=1, i \neq j}^{N} \Delta T_i \tag{2}$$

That is, an influence on the whole radio communication system by adjusting the tilt angle of the radio base station "j" can be divided into a change in the radio base station "j" and an influence on other stations. Further, in the second term of Formula (2), a radio base station where a throughput is changed by adjusting the tilt angle of the radio base station "j" is assumed to be limited to a radio base station adjacent to the radio base station "j". Assume that a group of radio base stations adjacent to the radio base station "j" is "Nb (j)". Total change in throughput of the radio communication system is expressed by Formula (3).

$$\Delta T = \sum_{i=1}^{N} \Delta T_i \approx \Delta T_j + \sum_{i \in N_b, i \neq j}^{N} \Delta T_i \tag{3}$$

In short, the radio base station "j" sums a change in throughput of the own station and a change in throughput of the adjacent radio base stations, thus calculating the total throughput of the radio communication system. This consequently allows the radio communication system to execute the following processing. In the case where the summed value "ΔT" of the respective radio base stations is positive, the processing employs the adjustment of the tilt angle. In the case where the summed value "ΔT" is negative, the processing turns back the adjustment of the tilt angle. This consequently improves the total throughput of the radio communication system.

(6) A Radio Parameter

While in the above embodiments, the adjustment of the tilt angle as an example of the radio parameter is described, not only the tilt angle but also a transmission power, a beam shape (antenna directionality), or the like may be adjusted. For example, in the case where a transmission power is adjusted, an adjustment value is set to "+ΔP" (P>0) and then the transmission power without change is used if the radio characteristic has been improved or an adjustment "−ΔP" is performed to cancel the adjustment if the radio characteristic has not been improved. For example, in the case where a beam shape is adjusted, an adjustment value for a beam width, a beam size, or the like is set to "+ΔW" (W>0), and then the adjustment value without change is used if a radio characteristic has been improved or an adjustment "−ΔW" is performed to cancel the adjustment if the radio characteristic has not been improved. A radio parameter such as the transmission power, the beam shape, and the like are applicable to all embodiments described above.

(7) Configuration of the Apparatus

The processing procedures, control procedures, specific names, information including various data and the parameter (for example, the procedure in "the control clock generating unit 110") in the above description and the drawings may be modified, unless otherwise stated. That is, the control clock generating unit 110 may employ any processing procedure and control procedure insofar as the processing outputs a signal in a predetermined cycle.

The constituent elements of the radio base station are depicted in the drawings based on functional concepts and do not necessarily have to be physically configured in the manner depicted in the drawings. That is, specific examples of distribution and integration regarding the respective apparatuses are not limited to those described in the drawings. All or parts of apparatuses may physically be distributed or integrated in any unit corresponding to various kinds of load and usage status. For example, the adjusting unit 120 may be distributed as "a throughput calculator" and "an adjusting unit". The throughput calculator calculates throughput of the own station. The adjusting unit adjusts a tilt angle based on throughput.

An aspect of the radio base station and the method of adjusting the radio parameter disclosed in this application ensures adjusting the coverage of the cell, which is formed by the radio base station, with high accuracy as an advantageous effect.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A radio base station that forms a cell corresponding to a radio parameter value, the radio base station comprising:
   an adjusting unit that adjusts a radio parameter value of the radio base station;
   a notifying unit that notifies another radio base station of the adjustment of the radio parameter value; and a receiving unit that receives information from the other radio base station, the information relating to an influence on a radio characteristic of a cell formed by the other radio base station, the radio characteristic being influenced by the adjustment of the radio parameter of the radio base station, wherein the adjusting unit readjusts the radio parameter value of the radio base station based on the information, the information relating to the influence on the radio characteristic of the cell formed by the other radio base station, the radio characteristic being influenced by the adjustment of the radio parameter value of the radio base station.

2. The radio base station according to claim 1, wherein the adjusting unit readjusts the radio parameter value of the radio base station, based on information relating to an influence on a radio characteristic of a cell formed by the radio base station, the radio characteristic being influenced by the adjustment of the radio parameter value of the radio base station, and information relating to an influence on a radio characteristic of a cell formed by the other radio base station, the radio characteristic being influenced by the adjustment of the radio parameter value of the radio base station.

3. The radio base station according to claim 1, wherein the adjusting unit adjusts the radio parameter value of the radio base station in a predetermined cycle.

4. The radio base station according to claim 3, wherein the adjusting unit adjusts the radio parameter value of the radio base station in a cycle, the cycle being shorter than the predetermined cycle when a failure of the other radio base station is detected.

5. The radio base station according to claim 1, wherein the adjusting unit readjusts the radio parameter value of the radio base station based on information, the information relating to an influence on a radio characteristic of a radio terminal by the adjustment of the radio parameter value of the radio base station, the radio terminal being in the boundary between a cell formed by the radio base station and a cell formed by the other radio base station.

6. The radio base station according to claim 1, wherein the adjusting unit readjusts the radio parameter value of the radio base station in the adjustment of the radio parameter value of the radio base station, based on a throughput of a cell formed by the radio base station, and a throughput of a cell formed by the other radio base station.

7. The radio base station according to claim 1, wherein the adjusting unit readjusts the radio parameter value of the radio base station in the adjustment of the radio parameter value of the radio base station, based on a reception quality of all radio terminals, all the radio terminals being covered by a cell formed by the radio base station, and a reception quality of all radio terminals, all the radio terminals being covered by a cell formed by the other radio base station.

8. The radio base station according to claim 1, wherein the adjusting unit arbitrarily adjusts the radio parameter value of the radio base station.

9. The radio base station according to claim 1, wherein the adjusting unit adjusts the radio parameter value of the radio base station based on a previous adjustment result.

10. The radio base station according to claim 1, wherein the adjusting unit determines an adjustment cycle and an adjustment amount of the radio parameter value of the radio base station, based on information relating to an influence on a radio characteristic of a cell formed by the radio base station, and information relating to an influence on a radio characteristic of a cell formed by the other radio base station.

11. A method of adjusting a radio parameter used in a radio communication system where a plurality of radio base stations form respective cells corresponding to a radio parameter value of the radio base station, the method comprising:

adjusting a radio parameter value of a first radio base station by the first radio base station, the first radio base station forming a first cell, and notifying a second radio base station of the adjustment of the radio parameter value of the first radio base station, the second radio base station forming a second cell;

transmitting information from the second radio base station to the first radio base station in response to the notification from the first radio base station, the information relating to an influence on a radio characteristic of the second cell by the adjustment of the radio parameter value of the first radio base station; and receiving the information from the second radio base station at the first radio base station, and readjusting the radio parameter value of the first radio base station by the first radio base station based on the information, the information relating to the influence on the radio characteristic of the second cell by the adjustment of the radio parameter value of the first radio base station.

* * * * *